United States Patent [19]
Thuries

[11] Patent Number: 5,753,860
[45] Date of Patent: May 19, 1998

[54] CONDUCTOR BAR FOR A METAL-CLAD HIGH VOLTAGE ELECTRICAL APPARATUS

[75] Inventor: Edmond Thuries, Meyzieu, France

[73] Assignee: GEC Alsthom T & D SA, Paris, France

[21] Appl. No.: 729,424

[22] Filed: Oct. 11, 1996

[30] Foreign Application Priority Data

Oct. 13, 1995 [FR] France .................. 95 12024

[51] Int. Cl.$^6$ .................................................. H01B 9/06
[52] U.S. Cl. ............................................................ 174/68.1
[58] Field of Search ........................... 174/68.1; 218/118, 218/128, 121

[56] References Cited

U.S. PATENT DOCUMENTS

| | | | |
|---|---|---|---|
| 3,953,698 | 4/1976 | Luttgert et al. | 200/279 |
| 5,089,665 | 2/1992 | Thuries | 174/27 |

FOREIGN PATENT DOCUMENTS

| | | | |
|---|---|---|---|
| 0400593A1 | 12/1990 | European Pat. Off. | H02B 13/065 |
| 1397698 | 3/1964 | France . | |
| 3240786A1 | 5/1984 | Germany | H02G 5/00 |
| 596686 | 3/1978 | Switzerland | H02B 13/06 |
| 2095023 | 9/1982 | United Kingdom | H01B 9/06 |

*Primary Examiner*—Kristine L. Kincaid
*Assistant Examiner*—Joseph Waks
*Attorney, Agent, or Firm*—Sughrue, Mion, Zinn, Macpeak & Seas, PLLC

[57] ABSTRACT

A conductor bar for a metal-clad high voltage electrical apparatus, the bar including a metal tubular cylinder of diameter (D) provided at at least one of its ends with a connection flange for connection to an insulator. Between an end and the flange, the bar presents a cylindrical portion of diameter (d) less than (D) and connected to the cylinder via a transition portion formed by a conical annulus. The transition portion is provided with at least one slot forming a current path that extends transversely relative to the bar.

5 Claims, 1 Drawing Sheet

CONDUCTOR BAR FOR A METAL-CLAD HIGH VOLTAGE ELECTRICAL APPARATUS

The present invention relates to a conductor bar for a metal-clad high voltage electrical apparatus.

More precisely, the invention relates to a conductor bar for a metal-clad high voltage electrical apparatus, in which the bar comprises a metal tubular cylinder of diameter D provided at at least one of its ends with a flange for coupling to an insulator.

BACKGROUND OF THE INVENTION

Metal-clad apparatuses suffer from a major problem of the risk of an internal arc appearing and then moving along its conductor bars to the ends thereof, thus damaging the coupling flanges of the conductor bars and puncturing the metal cladding of the apparatus. A known way of solving this problem is to make the flange and the metal cladding out of aluminum and to give them both adequate thickness.

However, in order to further increase the time taken by an internal arc to puncture the metal cladding, it would be necessary to increase the thickness unacceptably.

OBJECT AND SUMMARY OF THE INVENTION

The present invention solves this problem by proposing a bar configuration that can withstand an internal arc for a longer period of time, without requiring its working thickness to be increased.

To do this, between said end and the flange, the bar of the invention presents a cylindrical portion of diameter d less than D and connected to said cylinder via a transition portion formed by a conical annulus, said transition portion being provided with at least one slot forming a current path that extends transversely relative to the bar.

The conical transition portion deflects the electric field so that it intersects at a relatively large angle any arc that appears close to the flange. This effect is combined with an effect of the arc being caused to rotate by the configuration of the slot formed in said conical transition portion.

Thus, close to the end of the bar, any arc is caused to rotate, thereby eliminating stagnation thereof and thus very significantly delaying any damage therefrom.

Such slots creating transverse current trajectories are known per se. They are to be found in the contacts of vacuum circuit-breakers and they can be implemented in various different ways, e.g. in the form of radial slots that are rectilinear or semi-spiral.

In a preferred embodiment of the present invention, the transition portion is provided with two slots that are symmetrical about the longitudinal axis of the bar, each being constituted by a first slot segment in the form of a circular arc of radius r1 less than D/2, with one end thereof being extended by a radial second slot segment to a radius r2 smaller than r1, in turn extended by a third slot segment in the form of a circular arc.

Preferably, said transition portion is inclined at an angle substantially equal to 45° relative to the longitudinal axis of the bar.

In order to eliminate any edge that could give rise to the appearance of dielectric components and facilitate capture of an internal arc, said transition portion is connected to said cylinder via a rounded edge, and the edges of the slots are preferably also rounded.

BRIEF DESCRIPTION OF THE DRAWING

The invention is described in greater detail with reference to the figures which merely show a preferred embodiment of the invention.

MORE DETAILED DESCRIPTION

Figure 1:
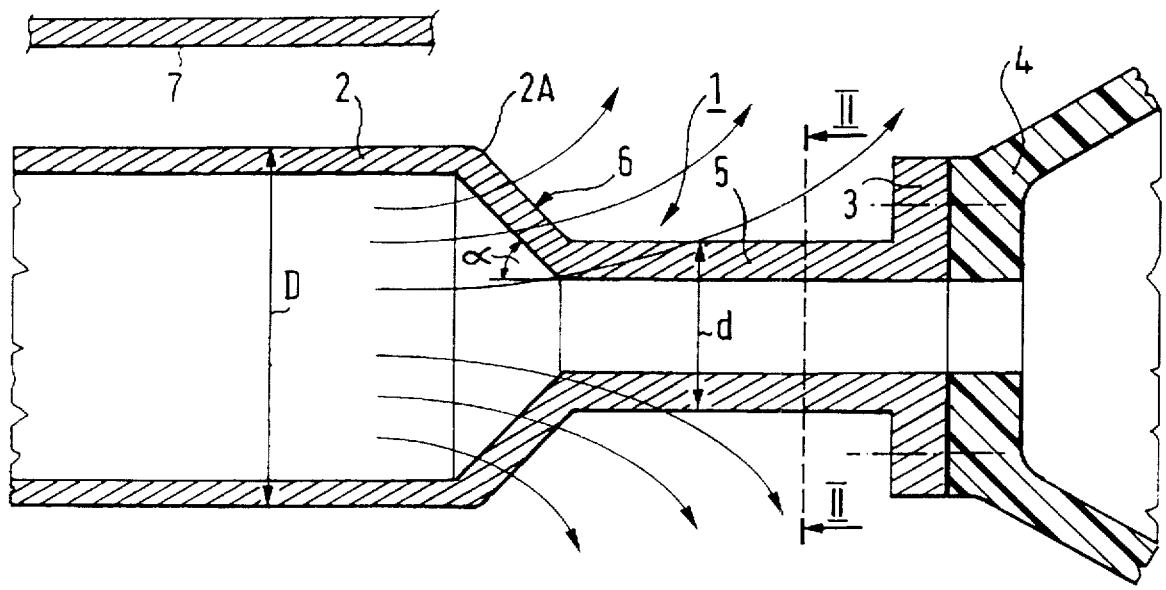
FIG. 1 is a fragmentary side view of a bar of the invention.

A conductor bar 1 for a metal-clad high voltage electrical apparatus comprises a metal tubular cylinder 2 of diameter D provided at its end with a flange 3 for coupling to an insulator 4 that is generally conical in shape, and between said end and the flange 3 it has a cylindrical portion 5 of diameter d smaller than D and connected to the cylinder 2 via a transition portion 6 formed by a conical annulus. The transition portion 6 is preferably inclined at an angle $\alpha$ that is substantially equal to 45° relative to the longitudinal axis of the bar 1.

The conical transition portion deflects the electric field (as represented by fine lines in FIG. 1) which intersects any arc at a relatively large angle should an arc appear in the vicinity of the flange. The transition portion 6 is provided with at least one slot 6A, 6B to form a current path that is transversal relative to the bar 1. This achieves the advantageous effect of the invention whereby the arc is caused to rotate, thus preventing it from stagnating in the vicinity of the flange 3, thereby increasing the time taken by an arc to puncture metal cladding 7, exterior of cylinder 2 and spaced radially therefrom.

Figure 2:
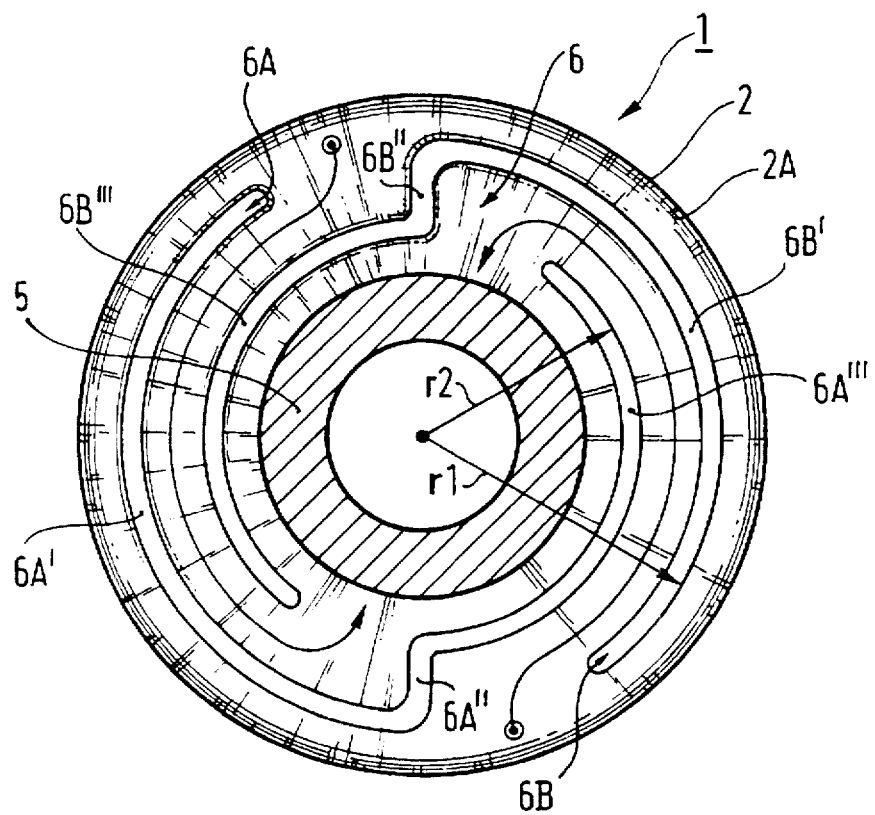
FIG. 2 is a cross-section on II—II.

A preferred embodiment of these slots is shown in FIG. 2.

The slots 6A and 6B are of similar shape and they are intermeshed over the surface of the transition portion 6. Each is constituted by a first slot segment 6A', 6B' in the form of a circular arc of radius r1 less than D/2 with one end thereof being extended by a radial second slot segment 6A", 6B" to a radius r2 less than r1, and in turn extended by a third slot segment 6A'", 6B'" in the form of a circular arc on the opposite side of the longitudinal axis of the bar to the first slot segment 6A', 6B'. The two slots 6A and 6B are symmetrical about said axis.

In order to eliminate any risk of the internal arc being captured, the transition portion 6 is connected to the cylinder 2 via a rounded edge 2A. Similarly, the edges of the slots 6A and 6B are rounded.

I claim:

1. In a conductor bar for a metal-clad high voltage electrical apparatus, the bar comprising a metal tubular cylinder of diameter (D) provided at at least one of its ends with a connection flange for connection to an insulator, the improvement wherein, between at least one of said ends and the flange, the bar presents a cylindrical portion of diameter (d) less than (D) and connected to said cylinder via a transition portion formed by a conical annulus, said transition portion being provided with at least one slot forming a current path that extends transversely relative to the bar.

2. A bar according to claim 1, wherein said transition portion is inclined at an angle substantially equal to 45° relative to the longitudinal axis of the bar.

3. A bar according to claim 1, wherein the transition portion is provided with an additional slot that is symmetrical about the longitudinal axis of the bar to said at least one slot, each being constituted by a first slot segment in the form of a circular arc of radius (r1) less than one half diameter (D), with an end thereof being extended by a radial second slot segment to a radius (r2) smaller than radius (r1), in turn extended by a third slot segment in a form of a circular arc.

4. A bar according to claim 1, wherein said transition portion is connected to said cylinder via a rounded edge.

5. A bar according to claim 1, wherein said slots have rounded edges.

* * * * *